(12) United States Patent
Hu (10) Patent No.: US 7,729,550 B2
(45) Date of Patent: Jun. 1, 2010

(54) METHOD FOR IMAGE COMPRESSION CODING

(75) Inventor: Po-Chin Hu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 799 days.

(21) Appl. No.: 11/626,531

(22) Filed: Jan. 24, 2007

(65) Prior Publication Data

US 2008/0118164 A1    May 22, 2008

(30) Foreign Application Priority Data

Nov. 17, 2006    (TW) .............................. 95142535 A (51) Int. Cl.
    *G06K 9/36*     (2006.01)
    *H04L 23/02*     (2006.01)
    *G06K 9/46*     (2006.01)

(52) U.S. Cl. ...................... 382/237; 375/262

(58) Field of Classification Search ......... 382/218–220, 382/232, 237, 240, 248, 250–251, 253, 254; 375/240–240.25, 261.2, 261.3, 262, 263, 375/265, 290, 292; 348/400.1, 414.1; 714/758, 714/784, 790
See application file for complete search history.

(56) References Cited

U.S. PATENT DOCUMENTS

| | | | | |
|---|---|---|---|---|
| 4,660,214 A * | 4/1987 | Pahlavan et al. ............. 375/262 |
| 4,831,635 A * | 5/1989 | Lee et al. ..................... 375/292 |
| 4,941,154 A * | 7/1990 | Wei ............................. 375/265 |
| 5,023,889 A * | 6/1991 | Divsalar et al. ............. 375/244 |
| 5,159,610 A * | 10/1992 | Eyuboglu et al. ........... 375/290 |
| 5,251,236 A * | 10/1993 | Brehmer et al. ............. 375/298 |
| 6,034,996 A * | 3/2000 | Herzberg ..................... 375/265 |
| 6,052,821 A * | 4/2000 | Chouly et al. ............... 714/790 |
| 6,118,826 A * | 9/2000 | Zehavi et al. ............... 375/261 |
| 6,125,149 A * | 9/2000 | Jafarkhani et al. .......... 375/262 |
| 6,160,854 A * | 12/2000 | Heegard et al. ............. 375/265 |
| 6,501,860 B1 | 12/2002 | Charrier et al. |
| 6,535,647 B1 | 3/2003 | Abousleman |
| 6,731,692 B1* | 5/2004 | Bhoja .......................... 375/286 |
| 6,795,507 B1* | 9/2004 | Xin et al. ..................... 375/265 |
| 2008/0118164 A1* | 5/2008 | Hu .............................. 382/237 |

OTHER PUBLICATIONS

M. Boo et al., "High Performance VLSI Architecture for the Trellis Coded Quantization" Image Processing 1996, Proceedings International Conference vol. 1, pp. 996-998.

* cited by examiner

*Primary Examiner*—Amir Alavi
(74) *Attorney, Agent, or Firm*—J.C. Patents (57) ABSTRACT

A method for image compression coding is provided. According to the method, a plurality of codebooks is created according to the correlation between pixels, and the quantization value of each state is determined by dynamically looking up the codebooks. Therefore, the present invention not only enhances the image compression ratio but also improves the image compression quality.

9 Claims, 10 Drawing Sheets

METHOD FOR IMAGE COMPRESSION CODING

CROSS-REFERENCE TO RELATED APPLICATION

This application claims the priority benefit of Taiwan application serial no. 95142535, filed Nov. 17, 2006. All disclosure of the Taiwan application is incorporated herein by reference.

BACKGROUND OF THE INVENTION

1. Field of the Invention

The present invention relates to a method for image compression coding. More particularly, the present invention relates to a coding method for compressing images through trellis coded quantization (TCQ).

2. Description of Related Art

Trellis coded quantization is derived from trellis coded modulation (TCM). In recent years, trellis coded quantization is applied to various coding techniques for it has great compression capability. For example, trellis coded quantization is used as another option of scalar quantization in image compression standard JEPG2000 for improving image compression capability. In addition, trellis coded quantization is used as the coding technique in both the patent titled as "image encoder method" disclosed in the U.S. Pat. No. 6,535,647 and the patent titled as "digital signal coding and decoding based on subbands" disclosed in the U.S. Pat. No. 6,501,860.

Figure 1:
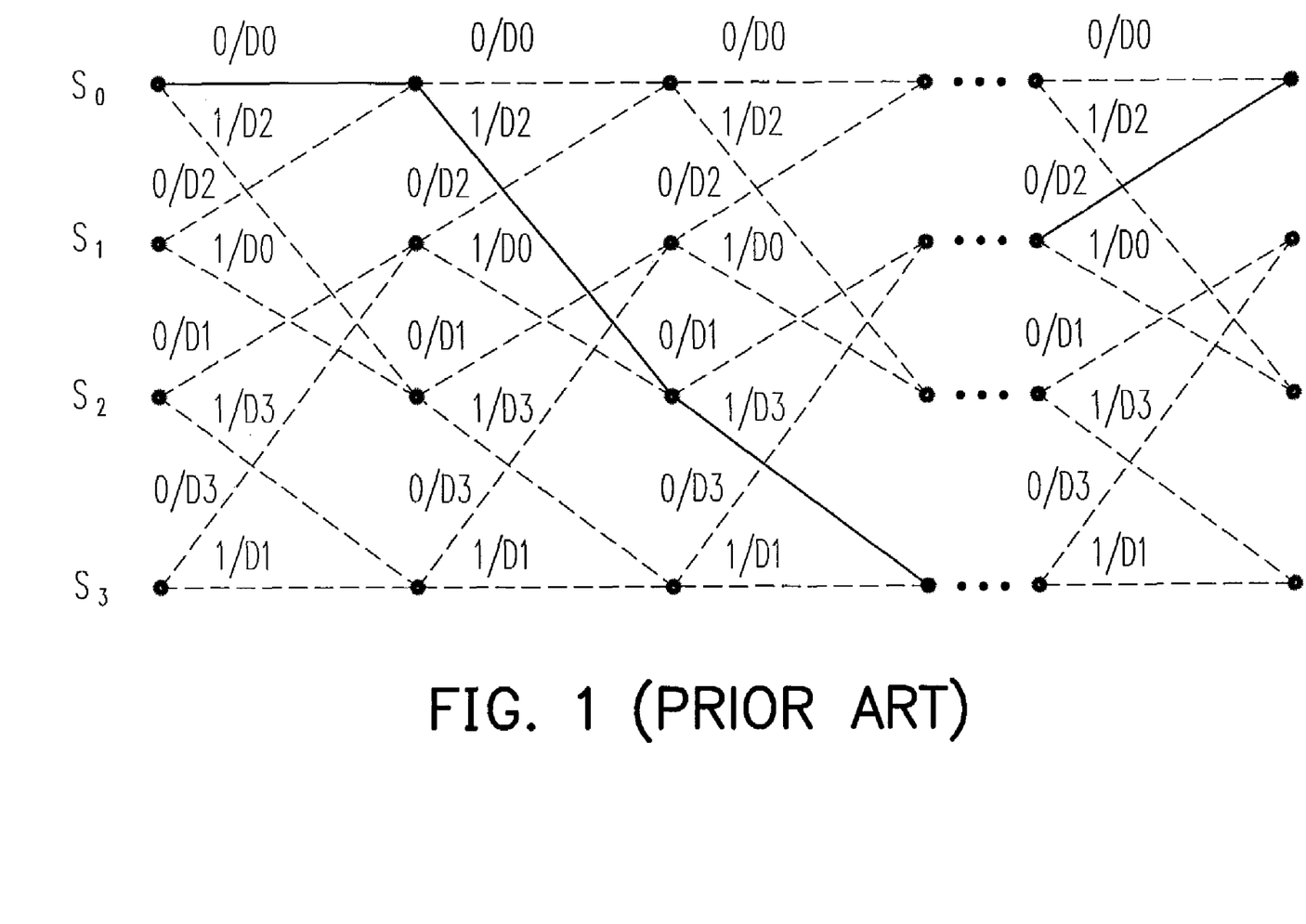
FIG. 1 is a trellis diagram illustrating a conventional coding technique.

With the great image compression capability of trellis coded quantization, Marcellin and Fischer also published a study about "trellis coded quantization of memoryless and Gauss-Markov sources" in "Transactions on communications", pp. 82~93, issued by IEEE (Institute of Electrical and Electronic Engineers) on 1990. According to this conventional technique, a trellis diagram illustrated in FIG. 1 is used for coding, wherein each node in FIG. 1 denotes one of states $S_0$~$S_3$, and a/b on each branch path denotes the input code/quantized subset from the previous state to the current state of the branch path.

During the coding procedure, a codebook is first looked up to obtain the quantization value of a quantized subset on each branch path in the trellis diagram. After that, the total error of each path is calculated according to the input message sources and the quantization value of the quantized subset on each branch path. A minimum error path is then selected from a plurality of paths as the coding path of the message sources, as the solid line in FIG. 1. Finally, a quantized codeword corresponding to each pixel is located by looking up the same codebook to obtain the encoded codeword.

As described above, the conventional trellis coded quantization is only suitable for coding in a frequency domain because the conventional trellis coded quantization is only suitable for frequency domain signals of low correlation since only one codebook is used for coding. Contrarily, if the conventional trellis coded quantization is used for spatial domain coding, coding distortion will be increased and further the encoded image quality will be affected. In other words, the image compression quality will be reduced if the conventional trellis coded quantization is used for spatial domain coding.

SUMMARY OF THE INVENTION

Accordingly, the present invention is directed to a method for image compression coding which improves image compression quality by creating a plurality of codebooks and looking up the codebooks dynamically.

To achieve the aforementioned and other objectives, the present invention provides an image compression coding method for encoding a pixel of K-bit gray-level resolution into an L-bit codeword, wherein K is an integer greater than 0, L is an integer and 0<L<K. The encoding method includes following steps. First, $2^K$ codebooks are created and a trellis coding diagram is provided. The trellis coding, diagram includes a plurality of stages, and each stage includes N states, wherein the states are respectively denoted as $S_0$~$S_{N-1}$, and N is an integer greater than 0. Thereafter, a plurality of specific branch paths connected to $S_i$ of the $r^{th}$ stage are located by starting off from all the states of the $(r-1)^{th}$ stage, wherein $S_i$ is the $i^{th}$ state, r is an integer greater than 0, i is an integer and $0<=i<=N-1$.

Thereafter, the quantization values of quantized subsets of the specific branch paths are determined by using an $r^{th}$ pixel, so as to determine the quantization value of $S_i$ of the $r^{th}$ stage and a survival path connected to $S_i$ by using the $r^{th}$ pixel and the quantization value of the quantized subsets of the specific branch paths. Accordingly, a minimum error path in the trellis coding diagram can be located, and a codeword corresponding to each pixel can be decided according to the minimum error path.

According to an exemplary embodiment of the present invention, when the trellis coding diagram includes f quantized subsets, each codebook includes f sets, and each set includes $2^{(L-1)}$ quantization values, wherein each set corresponds to a quantized subset, each quantization value corresponds to a quantized codeword, and f is an integer greater than 0.

According to an exemplary embodiment of the present invention, the step of determining the quantization value of quantized subsets of the specific branch paths by using an $r^{th}$ pixel further includes following steps. First, the codebook corresponding to the previous state of a specific branch path is looked up according to the quantized subset of the specific branch path, so as to locate a plurality of specific quantization values corresponding to the quantized subset of the specific branch path. After that, one of the specific quantization values is selected as the quantization value of the quantized subset of the specific branch path by using the $r^{th}$ pixel.

According to an exemplary embodiment of the present invention, the step of determining the quantization value of $S_i$ of the $r^{th}$ stage and a survival path connected to $S_i$ by using the $r^{th}$ pixel and the quantization value of the quantized subsets of the specific branch paths further includes following steps. First, the differences between the quantization values of the specific branch paths and the pixel value of the $r^{th}$ pixel are calculated respectively. Next, the foregoing calculation result is added to an accumulated error corresponding to the previous state of the specific branch paths for determining the quantization value of $S_i$ of the $r^{th}$ stage and the survival path connected to $S_i$.

According to an exemplary embodiment of the present invention, the step of locating a minimum error path of the $r^{th}$ stage in the trellis coding diagram further includes following steps. First, the accumulated errors of SFr(0)~SFr(N-1) are compared to determine a final state for coding. Next, all the survival paths coupled to the final state are connected together as the minimum error path, wherein SFr(0)~SFr(N-1) are states included in the $r^{th}$ stage of the trellis coding diagram.

According to an exemplary embodiment of the present invention, the step of determining a codeword corresponding to each pixel according to the minimum error path further includes following steps. First, a specific survival path corresponding to a pixel is located according to the minimum error path in order to look up the codebook corresponding to the previous state of the specific survival path by using the quantization value of the quantized subset of the specific survival path, and then an input code of the specific survival path and the output code of the pixel are encoded into a codeword corresponding to the pixel.

It should be mentioned here that the image compression coding method in the present invention is suitable for coding in a spatial domain.

According to the present invention, a plurality of codebooks is created according to the correlation between pixels and the codebooks are looked up according to the correlation between pixels, so that the present invention not only enhances the image compression ratio but also promotes the image compression quality.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally, image compression coding methods can be categorized into spatial domain and frequency domain codings. The coding method in the present invention is suitable for spatial domain coding and which can enhance the image compression ratio and also improve the image compression quality. The image compression coding method in the present invention will be described below with reference to exemplary embodiments thereof, and it should be understood by those skilled in the art that various changes in form and details may be made therein without departing from the spirit and scope of the present invention.

Figure 2:
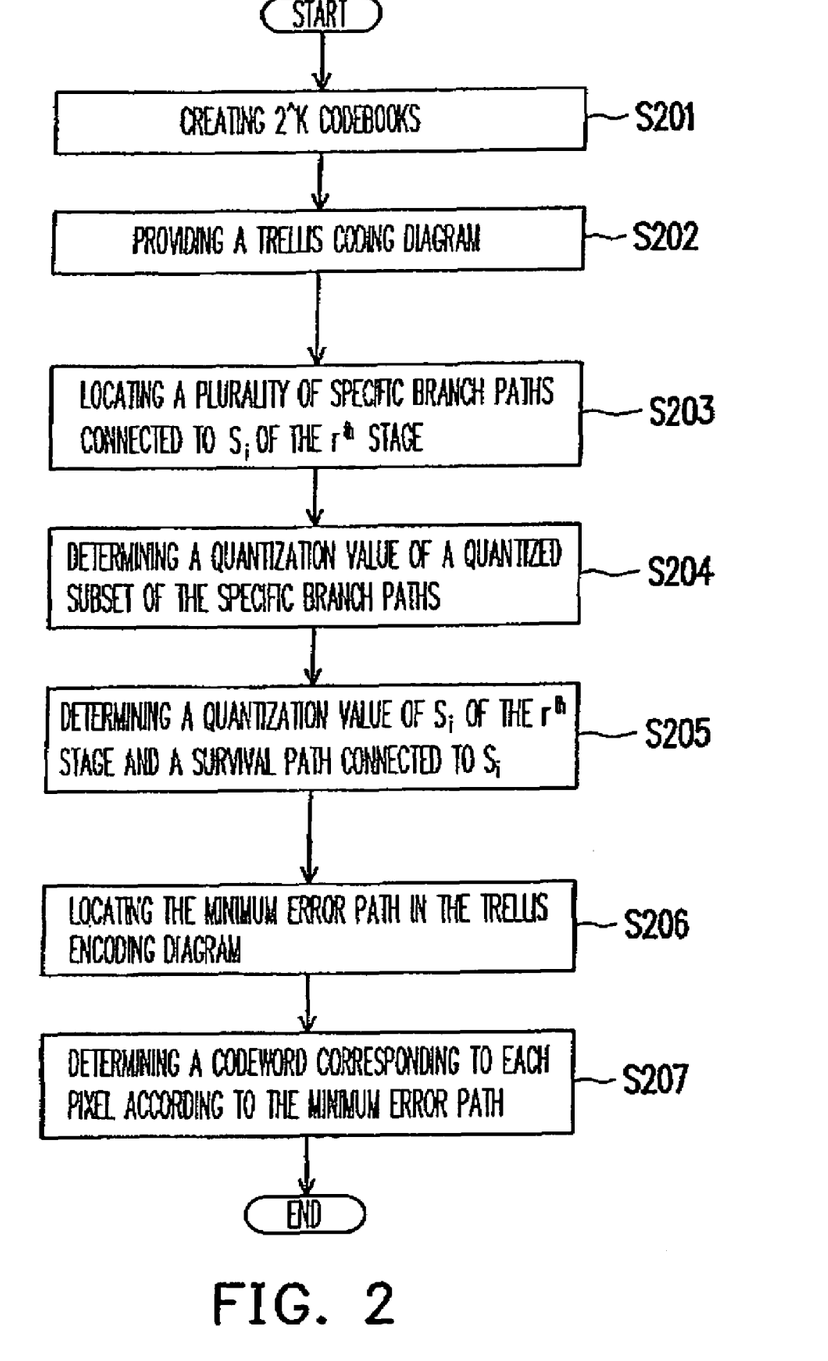
FIG. 2 is a flowchart illustrating an image compression coding method according to an exemplary embodiment of the present invention.

FIG. 2 is a flowchart illustrating an image compression coding method according to an exemplary embodiment of the present invention. In the present embodiment, a pixel of K-bit gray-level resolution is encoded into an L-bit codeword, wherein K is an integer greater than 0, L is an integer and 0<L<K. Referring to FIG. 2, first, $2^K$ codebooks are created in step S201 and a trellis coding diagram is provided in step S202.

Thereafter, a plurality of specific branch paths connected to $S_i$ of the $r^{th}$ stage are located in step S203 by respectively starting off from all states of the $(r-1)^{th}$ stage, so as to obtain a quantization value of each state and a survival path corresponding to each state, wherein $S_i$ denotes the $i^{th}$ state, r is an integer greater than 0, i is an integer and $0 \leq i \leq N-1$. After that, the quantization values of quantized subsets of the specific branch paths are determined by using the $r^{th}$ pixel in step S204. Accordingly, in step S205, the quantization value of $S_i$ of the $r^{th}$ stage and the survival path connected to $S_i$ are determined by using the $r^{th}$ pixel and the quantization values of the quantized subsets of the specific branch paths.

Finally, a minimum error path is located in the trellis coding diagram and a codeword corresponding to each pixel is determined according to the minimum error path in steps S206 and S207. Steps S201~S207 are further described below.

In step S210, each codebook includes f sets and each set includes $2^{(L-1)}$ quantization values if the trellis coding diagram includes f quantized subsets, wherein f is an integer greater than 0. Besides, each set corresponds to a quantized subset, and each quantization value corresponds to a quantized codeword.

Figure 3:
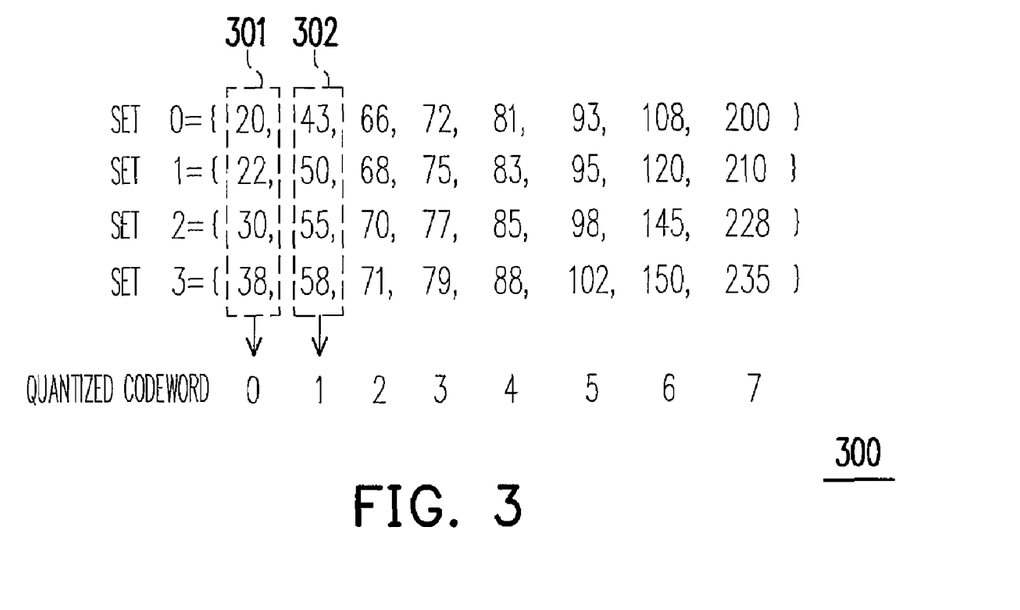
FIG. 3 and FIG. 4 respectively illustrate two codebooks in FIG. 2.
Figure 4:
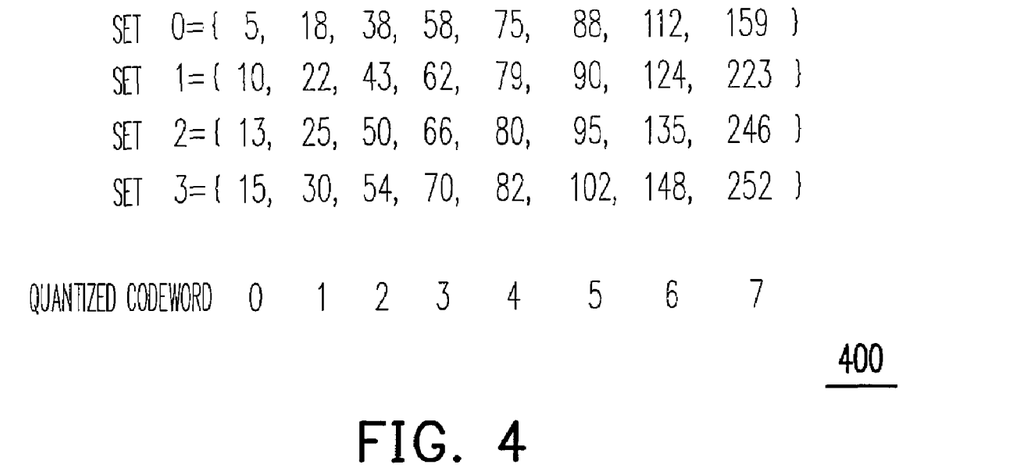

For example, assuming K=8, L=4, and f=4 (such assumptions are used in following steps throughout), which means a pixel of 8-bit gray-level resolution is to be encoded into a 4-bit codeword, two codebooks among 256 codebooks are respectively illustrated in FIG. 3 and FIG. 4. Referring to FIG. 3, the codebook 300 includes 4 sets: set 0, set 1, set 2, and set 3, and sets 0~3 respectively include 8 quantization values. For example, set 0 includes quantization values {20, 43, 66, 72, 81, 93, 108, 200}, set 1 includes quantization values {22, 50, 68, 75, 83, 95, 120, 210} and so on.

To be more specific, the first quantization values (20, 22, 30, 38) in sets 0~3 correspond to a quantized codeword (0), as shown in the dotted frame 301. Similarly, the second quantization values (43, 50, 55, 58) of sets 0~3 correspond to a quantized codeword (1), as shown in the dotted frame 302. The mappings between various quantization values in sets 0~3 and the quantized codeword 0~7 can be derived accordingly. Besides, the codebook 400 in FIG. 4 also includes sets 0~3, and the content of the codebook 400 is similar to that of the codebook 300, therefore which will not be described herein.

It should be noted that a K-bit pixel includes $2^K$ gray levels, and the $2^K$ gray levels respectively correspond to $2^K$ codebooks. Besides, while creating the codebooks, each codebook selects $f*2^{(L-1)}$ gray levels from the $2^K$ gray levels as the quantization values of the codebook according to the corresponding gray level of the codebook. For example, the codebook 300 in FIG. 3 corresponds to gray level 85, therefore the quantization values selected by the codebook 300 are mostly close to gray level 85. Similarly, the codebook 400 corresponds to gray level 80, therefore the quantization values selected by the codebook 400 are mostly close to gray level 80. In other words, codebooks are created according to the correlation between pixels in the present invention, so that the correlation between pixels is brought into the coding method of the present invention and accordingly the image compression quality is improved.

Figure 5:
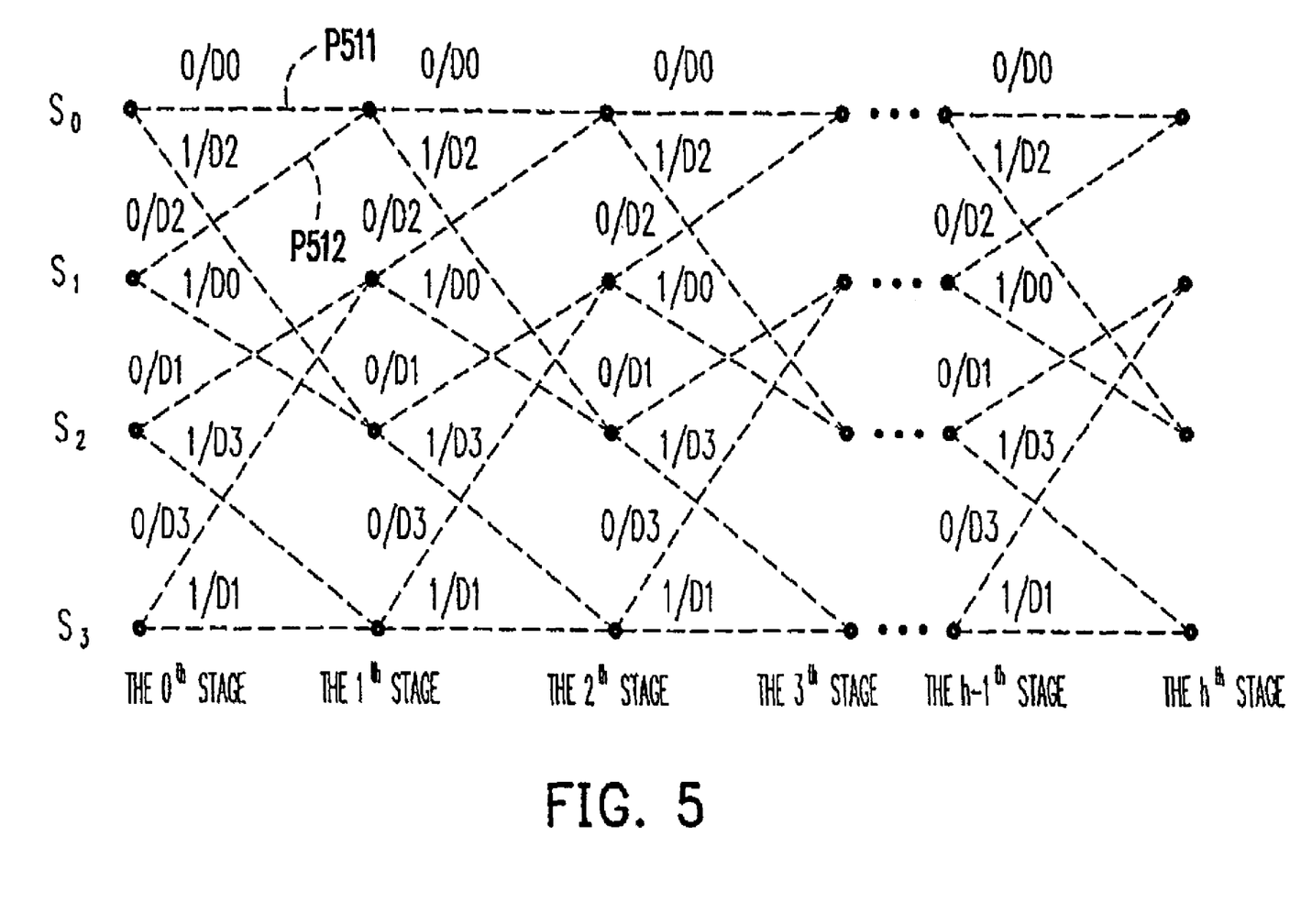
FIG. 5 is a trellis diagram illustrating the image compression coding method in FIG. 2.

On the other hand, the trellis coding diagram provided in step S202 includes a trellis diagram. For the purpose of illustration, a complete flow of the coding method in the present invention will be described with reference to the trellis diagram illustrated in FIG. 5. The nodes in FIG. 5 are used for denoting states $S_0$~$S_3$, the dotted lines are used for denoting branch paths between adjacent stages. In other words, the trellis diagram includes $0^{th}$~$h^{th}$ stages, and each stage includes 4 states $S_0$~$S_3$, wherein h is, an integer greater than 0. Besides, each stage is encoded corresponding to a pixel during the coding procedure.

It should be noted that the two states connected by each branch path are respectively referred to as the previous state and the current state according to the coding sequence thereof. For example, the previous state of branch path P511 is $S_0$ of the $0^{th}$ stage, and the current state of branch path P511 is $S_0$ of the $1^{st}$ stage. In addition, a/b on each branch path is, used for denoting the input code/quantized subset of the branch path. For example, 0/D0 on branch path P511 respectively denote the input code/quantized subset of branch path P511. Moreover, the quantized subsets D0~D3 respectively correspond to sets 0~3 of each codebook.

Figure 6:
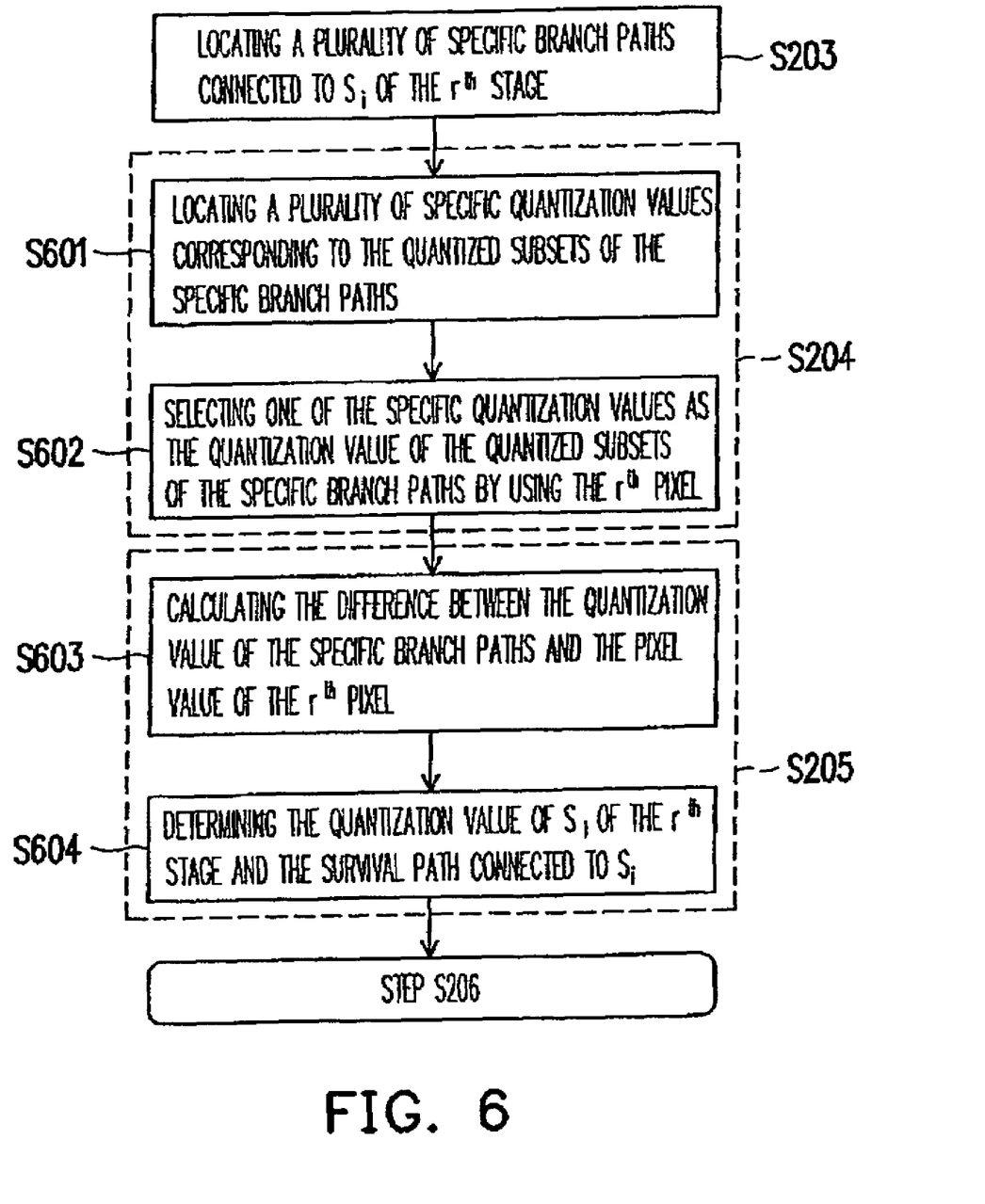
FIG. 6 is a flowchart further illustrating steps S203~S205 in FIG. 2.

Next, steps S203~S205 are further illustrated in FIG. 6. Referring to FIG. 6, the procedure for determining the quantization values of the quantized subsets of the specific branch paths (step S204) further includes following steps. First, a codebook corresponding to the previous state of a specific branch path is looked up in step S601 according to the quantized subset of the specific branch path, so as to locate a plurality of specific quantization values corresponding to the quantized subsets of the specific branch paths. Next, in step S602, one of the specific quantization values is selected as the quantization value of the quantized subset of the specific branch path by using the $r^{th}$ pixel.

On the other hand, the procedure for determining the quantization value of $S_i$ of the $r^{th}$ stage and the survival path connected to $S_i$ (step S205) further includes following steps. First, the differences between the quantization value of the specific branch paths and the pixel value of the $r^{th}$ pixel are respectively calculated in step S603. Next, in step S604, the quantization value of $S_i$ of the $r^{th}$ stage and the survival path connected to $S_i$ are determined according to the foregoing calculation result and an accumulated error corresponding to the previous state of the specific branch path.

Figure 7:
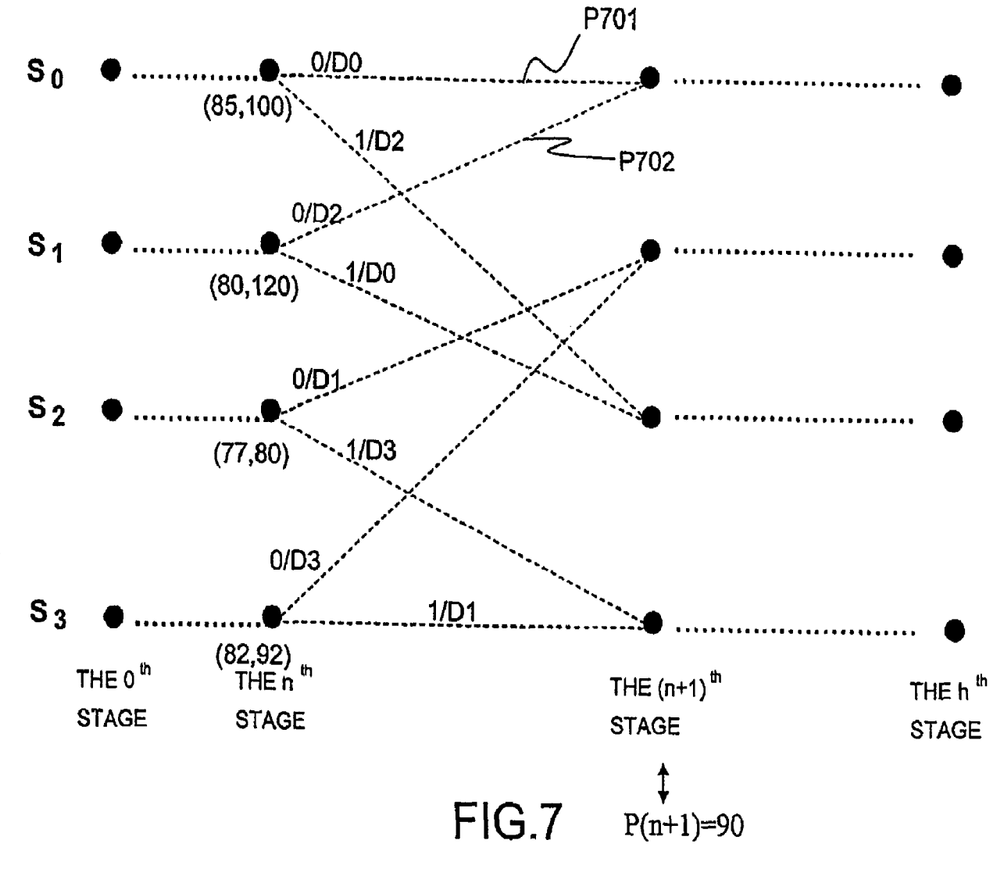
FIG. 7 is a trellis diagram illustrating the embodiment in FIG. 6.

For example, the procedure for coding from the $n^{th}$ stage to the $(n+1)^{th}$ stage in FIG. 5 will be described as an example, wherein n is an integer and $0<n<(h-2)$. For the purpose of illustration, FIG. 5 is re-illustrated as FIG. 7. Referring to FIG. 7, this coding procedure is to derive the quantization values of $S_0$~$S_3$ of the $(n+1)^{th}$ stage from the quantization values of $S_0$~$S_3$ of the $n^{th}$ stage, thus, the quantization values and the accumulated error corresponding to $S_0$~$S_3$ of the $n^{th}$ stage are already known, and which are respectively denoted as (c, d), wherein c is the quantization value of the state, and d is the accumulated error of the state. For example, on the $n^{th}$ stage, the quantization value of $S_0$ is 85; and the accumulated error of $S_0$ is 100. Besides, the pixel value P(n+1) of the $(n+1)^{th}$ pixel is assumed to be 90.

It should be noted that more than one branch paths are received-by the same state in a trellis coding diagram which has not been encoded. However, after the trellis coding diagram is encoded, only one branch path is received by the same state, and the branch path is referred to as the survival path of the state. For example, the trellis diagram in FIG. 5 is a trellis coding diagram which has not been encoded, thus, the branch paths received by $S_0$ of the $1^{st}$ stage includes P511 and P512. However, only one of the branch paths P511 and P512 is received by $S_0$ after the trellis diagram is encoded. The foregoing point will be further described in following coding steps. Moreover, when a survival path of a particular state is determined, all survival paths coupled to the state are determined at the same time, and the total of the errors of all the foregoing survival paths is the accumulated error of the state.

Next, referring to FIG. 6 and FIG. 7, the quantization value of $S_0$ of the $(n+1)^{th}$ stage is obtained by following steps. First, specific branch, paths P701 and P702 connected to $S_0$ of the $(n+1)^{th}$ stage are located first in step S203. Next, a codebook corresponding to the previous state $S_0$ of the specific branch path P701 is looked up in step S204. Since the quantization value of the previous state $S_0$ is 85 (gray level 85), the previous state $S_0$ corresponds to the codebook 300. After that, the specific quantization values corresponding to the specific branch path P701 are located according to the quantized subset D0 of the specific branch path P701, which are as the quantization values {20, 43, 66, 72, 81, 93, 108, 200} of the set 0 in the codebook 300. Next, the value 93 which is closest to P(n+1)=90 is located from the specific quantization values {20, 43, 66, 72, 81, 93, 108, 200} based on the pixel value P(n+1) of the $(n+1)^{th}$ pixel, and 93 is the quantization value of the quantized subset D0 of the specific branch path P702.

Similarly, the codebook corresponding to the previous state $S_1$ of the specific branch path P702 is obtained as the codebook 400. After that, the codebook 400 is looked up according to the quantized subset D2 of the specific branch path P702 and the specific quantization values corresponding to the specific branch path P702 are located as the quantization values {13, 25, 50, 66, 80, 95, 135, 246} of the set 2, in the codebook 400. Next, the value 95 which is closest to P(n+1)=90 is located from the specific quantization values {13, 25, 50, 66, 80, 95, 135, 246} based on P(n+1), and 95 is the quantization value of the quantized subset D2 of the specific branch path P702.

Next, in step S205, the quantization value (93) of the quantized subset D0 of the specific branch path P701 is calculated first, and the error thereof to P(n+1)=90, (the difference between the two) is 7. The quantization value (95) of the quantized subset. D2 of the specific branch path P702 is calculated, and the error thereof to P(n+1)=90 is 5. After that, the error 7 is added to the accumulated error (100) corresponding to the previous state $S_0$ of the specific branch path P701 to obtain a value 107. The error 5 is added to the accumulated error 120 corresponding to the previous state $S_1$ of the specific branch path P702 to obtain a value 125. The values 107 and 125 are compared and 107<125 is determined, thus, P701 is determined to be the survival path of $S_0$ of the $(n+1)^{th}$ stage, and the quantization value (93) of the quantized subset D0 of P701 is the quantization value of $S_0$ of the $(n+1)^{th}$ stage.

Figure 8:
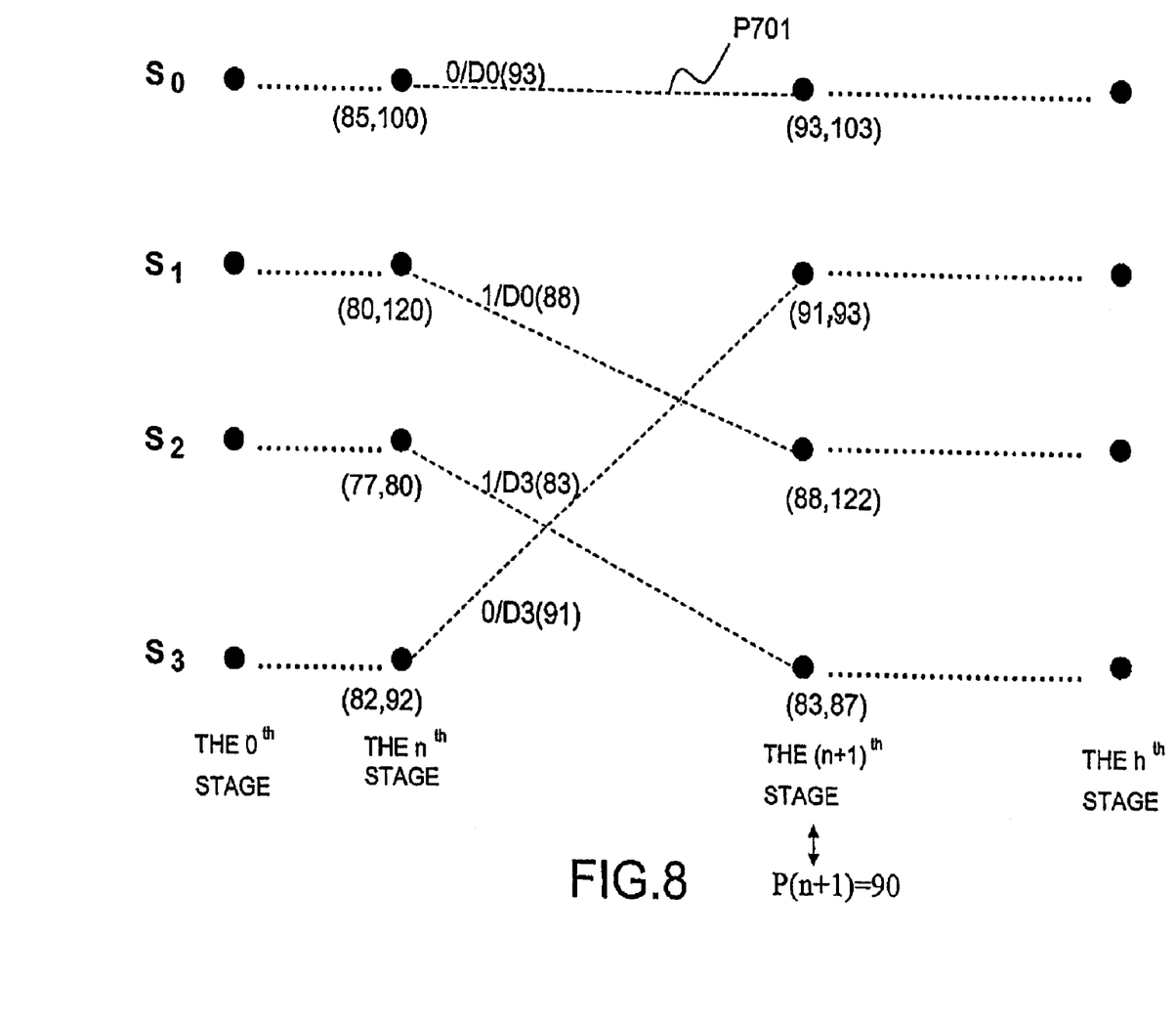
FIG. 8 is another trellis diagram illustrating the embodiment in FIG. 6.

The survival paths and quantization values of $S_1$~$S_3$ of the $(n+1)^{th}$ stage can be derived accordingly, and the coding result after steps S203~S205 is illustrated in FIG. 8. Referring to FIG. 8, it is proved that only one branch path (the survival path) is received by each state after a state diagram is encoded.

Figure 9:
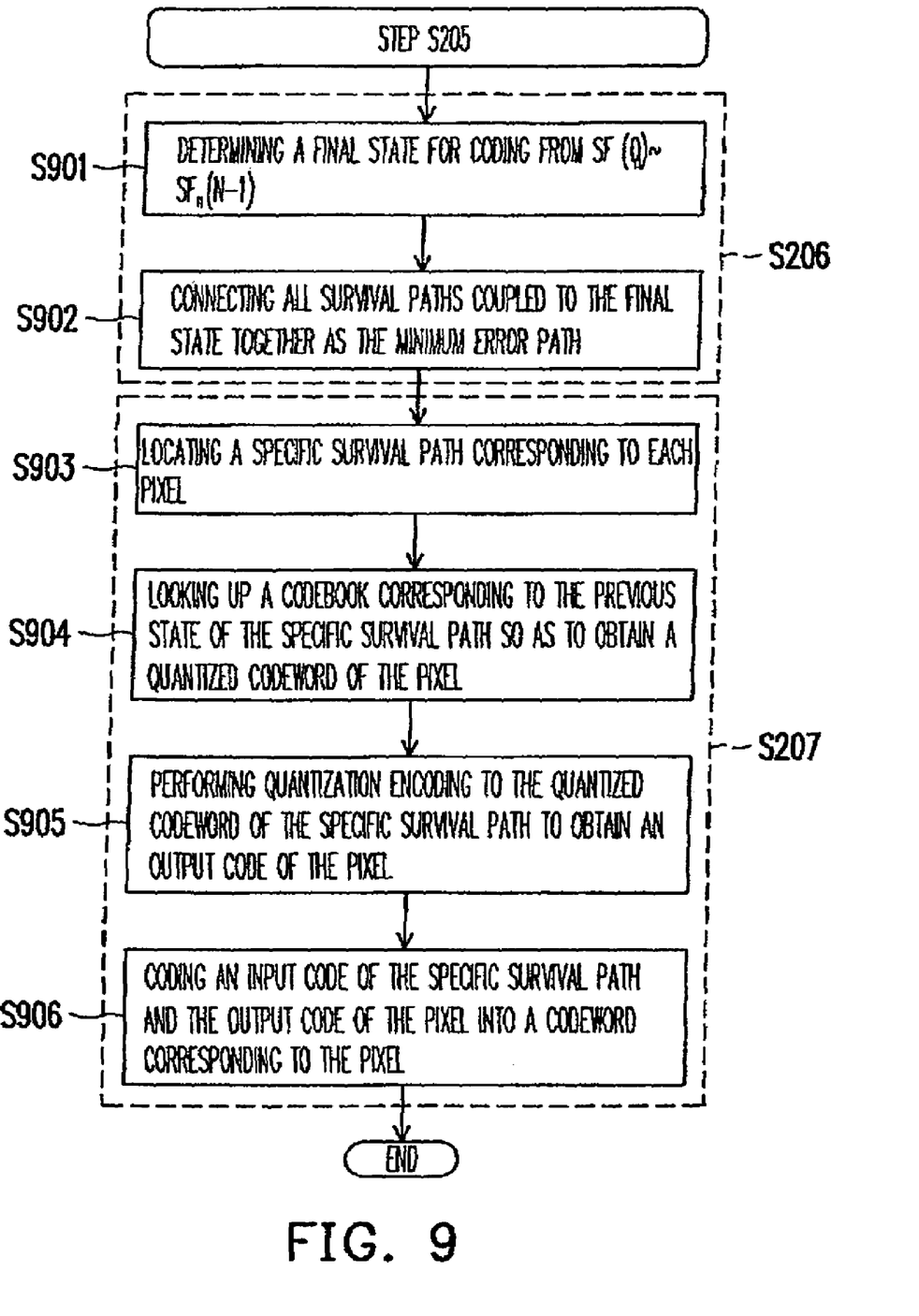
FIG. 9 is a flowchart further illustrating steps S206~S207 in FIG. 2.

Finally, steps S206 and S207 are further illustrated in FIG. 9. Referring to FIG. 9, the procedure for locating the minimum error path of the $n^{th}$ stage in the trellis coding diagram (step S206) further includes following steps. First, the accumulated errors of SFn(0)~SFn(N−1) are compared in step S901 to determine a final state for coding from SFn(0)~SFn(N−1), wherein SFn(0)~SFn(N−1) represent the states included in the last stage of the trellis coding diagram. Thereafter, in step S902, all the survival paths coupled to the final state are connected together to be used as the minimum error path.

On the other hand, the procedure for determining a codeword corresponding to each pixel (step S207) further includes following steps. First, a specific survival, path corresponding to each pixel is located according to the minimum error path in step S903, so that in step S904, a codebook corresponding to the previous state of the specific survival path can be looked up by using the quantization value of the quantized subset of the specific survival path, so as to obtain a quantized codeword of the pixel. After that, quantization coding is performed to the quantized codeword of the pixel to obtain an output code of the pixel, as in step S905. Finally, an input code of the specific survival path and the output code of the pixel are encoded into a codeword corresponding to the pixel in step S906.

Figure 10:
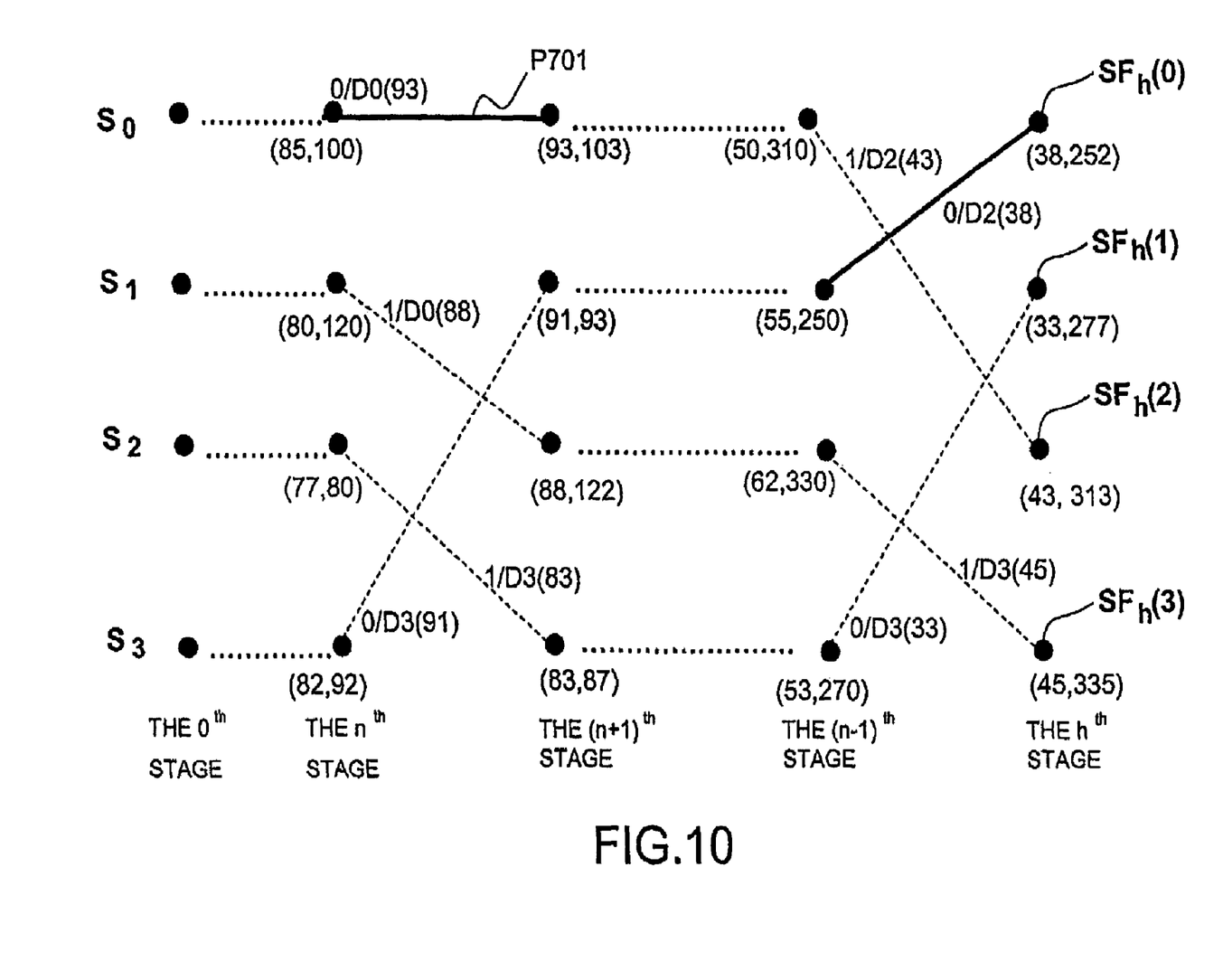
FIG. 10 is a trellis diagram illustrating the embodiment in FIG. 9.

For example, the states in FIG. 5 encoded in steps S203-S205 are illustrated in FIG. 10, wherein only the encoded states of the $n^{th}$, $(n+1)^{th}$, $(h-1)^{th}$, $h^{th}$ stage are illustrated, and $S_0 \sim S_3$ of the $h^{th}$ stage (the last stage) are respectively denoted as $SF_h(0) \sim SF_h(3)$. To obtain the minimum error path, the accumulated errors {252, 277, 313, 335} of $SF_h(0) \sim SF_h(3)$ are compared first, and it is determined that the accumulated error (252) of $SF_h(0)$ is the smallest, thus, $SF_h(0)$ is determined to be the final state for coding. After that, all the survival paths coupled to the final state $SF_h(0)$ are connected together (as the real line in FIG. 8) to be used as the minimum error path.

The procedure for determining a codeword corresponding to the $(n+1)^{th}$ pixel in FIG. 10 further includes following steps. First, the specific survival path corresponding to the $(n+1)^{th}$ pixel is located according to the minimum error path to be P701. Next, the codebook 300 corresponding to the previous state $S_0$ of P701 is looked up (as illustrated in FIG. 3). Here the quantized codeword (5) of the $(n+1)^{th}$ pixel is obtained from the codebook 300 according to the quantization value (93) of the quantized subset D0 of the specific survival path. With the coding length of each pixel of 3-bit (as to a 4-bit codeword, one among the 4 bits is the input code), the quantized codeword (5) is encoded into 101, and 101 is used as the output code of the pixel. Finally, an input code (0) of P701, and the output code (101) of the $(n+1)^{th}$ pixel are encoded into a codeword 0101 corresponding to the $(n+1)^{th}$ pixel.

Figure 11:
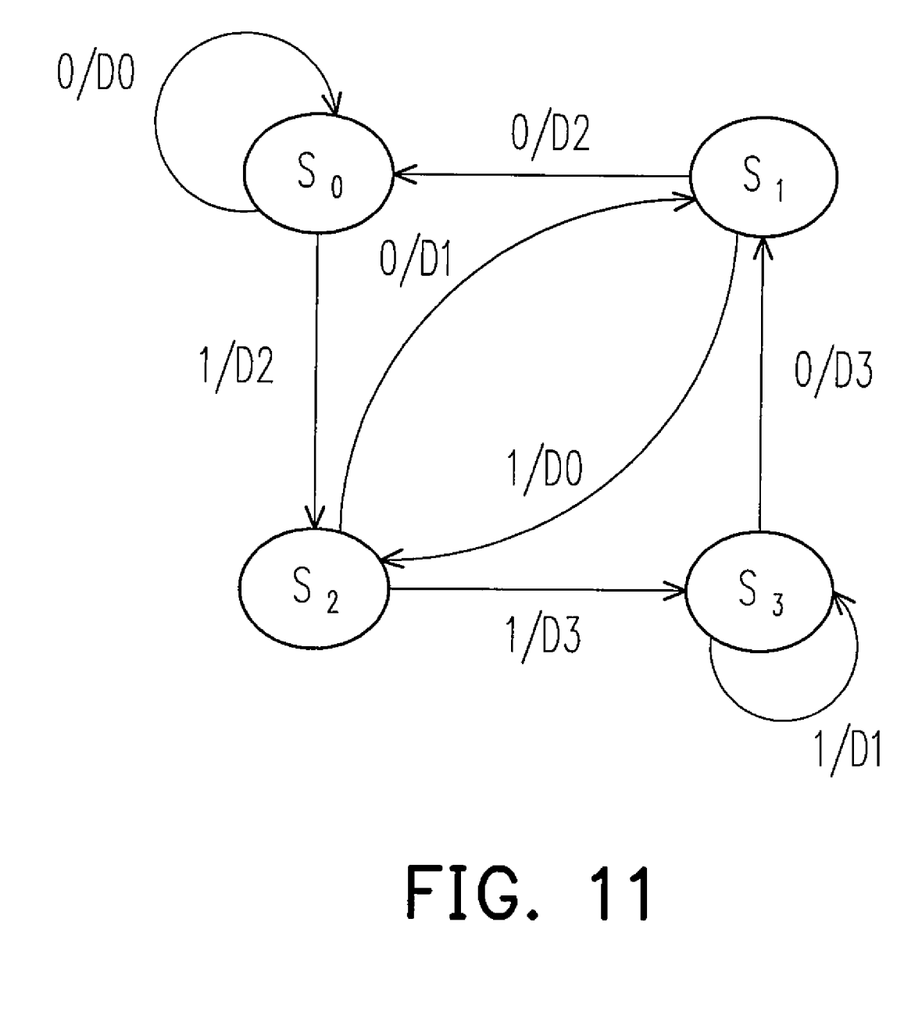
FIG. 11 is a state diagram according to an exemplary embodiment of the present invention.

It should be noted that the trellis coding diagram, provided in step S202 is derived from a state diagram. For example, the trellis diagram in FIG. 5 is formed by extending a state diagram several times, and as shown in FIG. 11, the state diagram includes states $S_0 \sim S_3$. The next state of state $S_0$ is states $S_0$ and $S_2$, the next state of state $S_1$ is states $S_0$ and $S_2$, the next state of state $S_2$ is states $S_1$ and $S_3$, and the next state of state $S_3$ is states $S_1$ and $S_3$.

In summary, according to the present invention, a plurality of codebooks are created according to the correlation between pixels and the codebooks are looked up dynamically, so that the correlation between pixels is considered in every step of the coding method of the present invention, accordingly, the coding method of the present invention not only enhances the image compression ratio but also improves the image compression quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for image compression coding, for coding a pixel of K-bit gray-level resolution into an L-bit codeword, wherein K is an integer greater than 0, L is an integer and 0<L<K, the coding method comprising:

creating $2^K$ codebooks;

providing a trellis coding diagram, the trellis coding diagram comprising a plurality of stages, each stage comprising N states respectively denoted as $S_0 \sim S_{N-1}$, wherein N is an integer greater than 0;

respectively starting off from all states of a $(r-1)^{th}$ stage to locate a plurality of specific branch paths connected to $S_i$ of a $r^{th}$ stage, wherein $S_i$ is a $i^{th}$ state, r is an integer greater than 0, i is an integer and $0 \leq i \leq N-1$;

determining a quantization value of quantized subsets of the specific branch paths by using an $r^{th}$ pixel;

determining a quantization value of $S_i$ of the $r^{th}$ stage and a survival path connected to $S_i$ by using the $r^{th}$ pixel and the quantization value of the quantized subsets of the specific branch paths;

locating a minimum error path in the trellis coding diagram; and determining a codeword corresponding to each pixel according to the minimum error path.

2. The coding method as claimed in claim 1, wherein each codebook comprises f sets and each set comprises $2^{(L-1)}$ quantization values when the trellis coding diagram comprises f quantized subsets, wherein each set corresponds to a quantized subset, each quantization value corresponds to a quantized codeword, and f is an integer greater than 0.

3. The coding method as claimed in claim 2, wherein the step of determining a quantization value of quantized subsets of the specific branch paths by using an $r^{th}$ pixel further comprises:

looking up a codebook corresponding to a previous state of the specific branch path according to the quantized subset of the specific branch path to locate a plurality of specific quantization values corresponding to the quantized subset of the specific branch path; and selecting one of the specific quantization values as a quantization value of the quantized subset of the specific branch path by using the $r^{th}$ pixel.

4. The coding method as claimed in claim 1, wherein the step of determining a quantization value of $S_i$ of the $r^{th}$ stage and a survival path connected to $S_i$ by using the $r^{th}$ pixel and the quantization value of the quantized subsets of the specific branch paths" further comprises:

calculating a difference between the quantization value of the specific branch paths and a pixel value of the $r^{th}$ pixel; and determining the quantization value of $S_i$ of the $r^{th}$ stage and the survival path connected to $S_i$ by using the difference between the quantization value of the specific branch paths and the pixel value of the $r^{th}$ pixel and an accumulated error corresponding to the previous states of the specific branch paths.

5. The coding method as claimed in claim 1, wherein the trellis coding diagram comprises h stages, and the $h^{th}$ stage comprises states $SF_h(0) \sim SF_h(N-1)$, wherein h is an integer greater than or equal to 0, the step of locating a minimum error path in the trellis coding diagram comprises:

comparing accumulated errors of $SF_h(0) \sim SF_h(N-1)$ to determine a final state for coding from $SF_h(0) \sim SF_h(N-1)$; and connecting all survival paths coupled to a final state together as a minimum error path.

6. The coding method as claimed in claim 1, wherein the step of determining a codeword corresponding to each pixel according to the minimum error path comprises:

locating a specific survival path corresponding to a pixel according to the minimum error path;

looking up a codebook corresponding to a previous state of the specific survival path by using the quantization value of the quantized subset of the specific survival path to obtain a quantized codeword of the pixel;

performing quantization coding to the quantized codeword of the pixel to obtain an output code of the pixel; and coding an input code of the specific survival path and the output code of the pixel into a codeword corresponding to the pixel.

7. The coding method as claimed in claim 1, wherein the trellis coding diagram is derived from a state diagram, and the state diagram is expressed as follows when N=4:

next state of $S_0$ is $S_0$ and $S_2$;
next state of $S_1$ is $S_0$ and $S_2$;
next state of $S_2$ is $S_1$ and $S_3$; and
next state of $S_3$ is $S_1$ and $S_3$.

8. The coding method as claimed in claim 1, wherein the trellis coding diagram comprises a trellis diagram.

9. The coding method as claimed in claim 1 suitable for coding in a spatial domain.

* * * * *